(12) United States Patent
Hong

(10) Patent No.: US 9,451,416 B2
(45) Date of Patent: Sep. 20, 2016

(54) INFORMATION PROCESSING METHOD AND COMMUNICATION SYSTEM

(71) Applicant: ZTE CORPORATION, Shenzhen, Guangdong Province (CN)

(72) Inventor: Liang Hong, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 0 days.

(21) Appl. No.: 14/429,080

(22) PCT Filed: Aug. 14, 2013

(86) PCT No.: PCT/CN2013/081423
§ 371 (c)(1),
(2) Date: Mar. 18, 2015

(87) PCT Pub. No.: WO2014/044097
PCT Pub. Date: Mar. 27, 2014

(65) Prior Publication Data
US 2015/0230062 A1 Aug. 13, 2015

(30) Foreign Application Priority Data
Sep. 19, 2012 (CN) .......................... 2012 1 0348952

(51) Int. Cl.
*H04W 4/06* (2009.01)
*H04M 3/56* (2006.01)
(Continued)

(52) U.S. Cl.
CPC ............. *H04W 4/06* (2013.01); *G06Q 10/109* (2013.01); *H04M 1/72552* (2013.01); *H04M 3/42136* (2013.01); *H04M 3/56* (2013.01); *H04W 4/12* (2013.01); *H04M 2203/2072* (2013.01); *Y02B 60/50* (2013.01)

(58) Field of Classification Search
CPC .......... G06Q 10/109; H04M 1/72552; H04M 2203/2072; H04M 3/42136; H04M 3/56; H04W 4/06; H04W 4/12
See application file for complete search history.

(56) References Cited

U.S. PATENT DOCUMENTS 7,734,927 B2 6/2010 Stewart et al.
2005/0067493 A1 3/2005 Urken
(Continued)

FOREIGN PATENT DOCUMENTS

CA 2289459 A1 11/1998
CN 1992622 A 7/2007
(Continued)

*Primary Examiner* — Kenneth Lam
(74) *Attorney, Agent, or Firm* — Ling Wu; Stephen Yang; Ling and Yang Intellectual Property

(57) ABSTRACT

An information processing method and a communication system, the method includes: first the communication system receiving inquiry information of a first communication client in the communication system according to a preset rule, and sending the inquiry information to M communication clients of a plurality of communication clients, wherein the M communications clients can be communication clients specified by a first client or another client; then receiving M feedbacks returned by the M communication clients, and processing the M feedbacks to obtain a statistical result, finally sending the obtained statistical result to the first communication client, that is, the information initiating end. Therefore, when the user needs to contact a plurality of persons, after sending inquiry information to a system, the system returns a unified result to the client, thereby reducing the user's operation process, lessening working power consumption of electronic devices, and saving the user's time.

9 Claims, 1 Drawing Sheet

(51) Int. Cl.
 *H04M 1/725* (2006.01)
 *H04W 4/12* (2009.01)
 *H04M 3/42* (2006.01)
 *G06Q 10/10* (2012.01)

(56) References Cited

U.S. PATENT DOCUMENTS

| | | | | |
|---|---|---|---|---|
| 2007/0282948 | A1* | 12/2007 | Praino | G06Q 10/10 709/204 |
| 2008/0032723 | A1* | 2/2008 | Rosenberg | G06Q 10/10 455/466 |
| 2008/0195464 | A1* | 8/2008 | Brooks | G06Q 10/06 705/7.42 |
| 2013/0080348 | A1* | 3/2013 | Pantaliano | G06Q 30/02 705/347 |

FOREIGN PATENT DOCUMENTS

| | | |
|---|---|---|
| CN | 101079829 A | 11/2007 |
| CN | 101175235 A | 5/2008 |
| EP | 1363221 A2 | 11/2003 |
| WO | WO2011159485 A1 | 12/2011 |

* cited by examiner

INFORMATION PROCESSING METHOD AND COMMUNICATION SYSTEM

TECHNICAL FIELD

The present document relates to the field of communication technologies, and more particularly, to an information processing method and a communication system.

BACKGROUND OF THE INVENTION

With the improvement of electronic technology, phones have become an essential communication tool, and people are increasingly dependent on the phones to complete information exchange and transfer with each other. Compared with the simple and effective single-point information transfer and feedback, multipoint information transfer, feedback and collection seem much more complicated.

For example, in the related art, when a user needs to contact twenty persons to communicate about one issue, the user needs to call these twenty contacts' phones or send text messages to these twenty individuals, to notify the twenty individuals to complete the issue, and receive feedbacks from these twenty individuals, then determine whether the issue passes through or not based on the feedbacks from the twenty individuals.

However, the inventors found that in the process of implementing the present document, the related art has the following technical problems or disadvantages:

when a user needs to contact multiple persons in the related art, the user needs to call these multiple contacts or send text messages to them, such that the amount of data processed by the electronic device increases and creates a pressure on the communications system, it also makes the user's operation complicated and results in wasting a lot of the user's time.

Furthermore, in the related art, after the user contacts multiple persons, the user will receive feedbacks from these contacts, at this time the user needs to process the feedbacks, while the electronic device cannot process the feedbacks, making the user's processing cumbersome and giving the user a great inconvenience.

Furthermore, in the related art, after the user receives the information fed back from the contacts, if the fed-back information is not unified, the user needs to repeatedly send inquiry information, so as to determine a final result, thus resulting in a complicated electronic device processing procedure, slow processing speed, and a quite cumbersome user operation procedure.

SUMMARY

The embodiment of the present document provides an information processing method and a communication system, to solve the problem in the related art that when a user needs to contact a plurality of persons, the user needs to call the plurality of contacts or send short messages to them, so that the amount of data processed by the electronic device increases, and causes pressure on the communication system. The specific technical scheme is as follows:

an information processing method which is applied to a communication system, wherein the communication system connects with a plurality of communication clients, and the method comprises:

receiving inquiry information of a first communication client in the communication system according to a preset rule;

sending the inquiry information to M communication clients of the plurality of communication clients, wherein, M is a positive integer greater than or equal to 2;

receiving M feedbacks from the M communication clients;

processing the M feedbacks and obtaining a statistical result;

sending the statistical result to the first communication client.

Alternatively, receiving the inquiry information of the first communication client in the communication system according to the preset rule comprises:

receiving subject information in the inquiry information of the first communication client according to a first preset rule;

after receiving the subject information, receiving N options in the inquiry information of the first communication client according to a second preset rule, wherein, N is a positive integer greater than or equal to 2.

Alternatively, receiving M feedbacks from the M communication clients is specifically:

receiving M feedbacks of first options selected by all of the M communication clients from the N options.

Alternatively, processing the M feedbacks to obtain a statistical result is specifically:

according to the received first options selected by the M communication clients from the N options, generating a statistical result comprising a first proportion relationship graph of a first proportion relationship between all of the first options in the N options.

Alternatively, after generating a statistical result comprising a first proportion relationship graph of a first proportion relationship between all of the first options in the N options, the method further comprises:

determining whether the first proportion relationship between all of the first options in the N options reaches a preset proportion relationship value or not, and generating a first determination result;

if the first determination result characterizes that the first proportion relationship between all of the first options in the N options does not reach the preset proportion relationship value, sending the first proportion relationship graph and the N options to the M communication clients.

Alternatively, after sending the first proportion relationship graph and the N options to the M communication clients, the method further comprises:

receiving a second option selected by each of the M communication clients from the N options;

processing the second options selected by the M communication clients, and obtaining a second proportion relationship between all of the second options in the N options;

determining whether the second proportion relationship reaches the preset proportion relationship or not, and generating a second determination result;

if the second determination result characterizes that the second proportion relationship reaches the preset proportion relationship, generating a second proportion relationship graph based on the second proportion relationship, and sending the second proportion relationship graph to the first communication client.

Alternatively, after sending the second proportion relationship graph to the first communication client, the method further comprises:

through the second proportion relationship graph, determining one option in the N options to send to a first communication client and the M communication clients.

Alternatively, the option information comprises one or more of the following items: time information, address information, and information of a number of persons.

Alternatively, the inquiry information is voice inquiry information or text inquiry information.

A communication system, wherein the communication system comprises:

a first receiving unit, configured to receive inquiry information of a first communication client in the communication system according to a preset rule;

a first sending unit, configured to send the inquiry information to M communication clients of a plurality of communication clients, wherein, M is a positive integer greater than or equal to 2;

a second receiving unit, configured to receive M feedbacks from the M communication clients;

a statistic unit, configured to process the M feedbacks to obtain a statistical result;

a sending unit, configured to send the statistical result to the first communication client.

Alternatively, the first receiving unit being configured to receive inquiry information of the first communication client in the communication system according to a preset rule, comprises:

receiving subject information in the inquiry information of the first communication client according to a first preset rule;

after receiving the subject information, receiving N options in the inquiry information of the first communication client in accordance with a second preset rule, wherein, N is a positive integer greater than or equal to 2.

Alternatively, the second receiving unit being configured to receive M feedbacks from the M communication clients, specifically is:

receiving M feedbacks of first options selected by all of the M communication clients from the N options.

Alternatively, the statistic unit being configured to process the M feedbacks to obtain a statistical result, specifically is:

according to the received first options selected by the M communication clients from the N options, generating a statistical result comprising a first proportion relationship graph of a first proportion relationship between all of the first options in the N options.

Alternatively, the option information comprises one or more of the following items: time information, address information, and information of a number of persons.

Alternatively, the inquiry information is voice inquiry information or text inquiry information.

One or more embodiments provided in the embodiment of the present document have at least the following technical effects or advantages:

in the embodiment of the present document, after receiving the inquiry information from the client, the communication system sends the inquiry information to the M specified communications clients, receives the feedbacks from the M communication clients simultaneously, processes the feedbacks, and finally obtains a statistical result, thereby achieving the efficiency of the communication system on multipoint information transfer, also adding the function of the communication system on the feedback processing, and saving the user's time for multipoint information transfer.

By setting a preset proportion relationship in the communication system to determine whether it needs to reselect or not, the process of the first communication client repeatedly sending an inquiry information is shortened, the communication pressure and the processing procedure of the communication system are lessened, the processing time of the communication system is shortened, the processing efficiency of the communication system is improved, the user's operation procedure is reduced, and the user's operation time is shortened.

PREFERRED EMBODIMENTS OF THE INVENTION

The embodiments of the present document provide an information processing method and system, the method is used in a communication system, the communication system is connected with a plurality of communication clients, first the communication system receives the inquiry information of the first communication client (information initiating end) in the communication system in accordance with the preset rule, and sends the inquiry information to M communication clients of the plurality of communication clients, wherein the M communications clients can be communication clients specified by the first client or another client, and then receives M feedbacks returned by the M communication clients, and processes the M feedbacks to obtain a statistical result, and finally sends the obtained statistical result to the first communication client, that is, the information initiating end. Therefore, it achieves that, when the user needs to contact a plurality of persons, the system returns a unified result to the client after the client sends inquiry information to a system, thereby reducing the user's operation procedure, lessening the working power consumption of the electronic device, and saving the user's time.

Hereinafter, through the accompanying drawings and specific embodiments, the technical scheme of the present document will be further described, it should be understood that, the embodiments of the present document are only used to provide a detailed description of, rather than intended to limit, the technical scheme of the present document, and in the case of no conflict, the embodiments and features in the embodiments the present document may be combined with each other.

Figure 1:
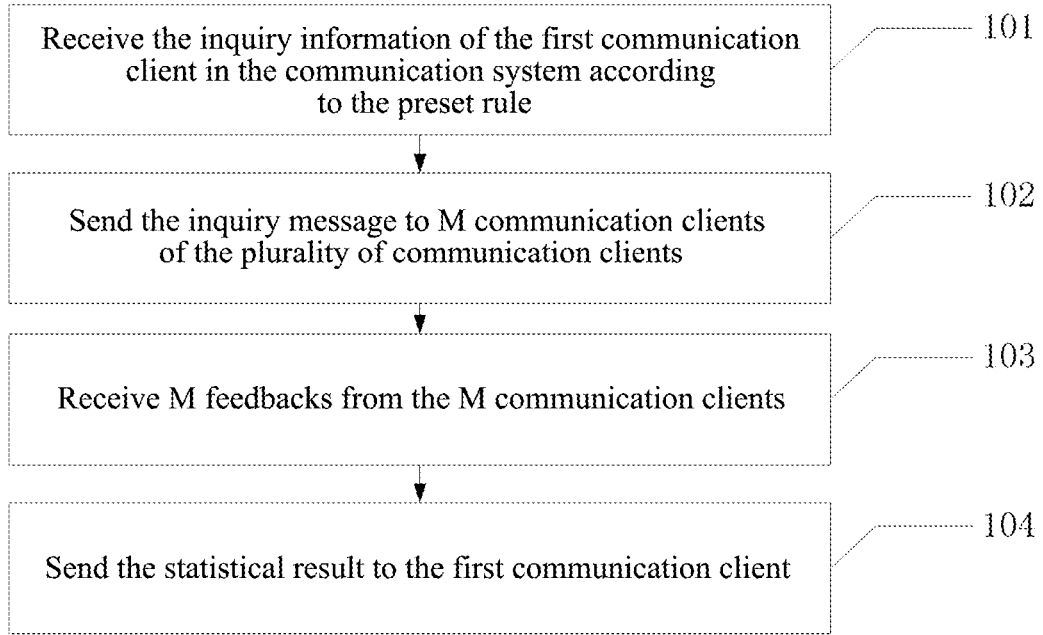
FIG. 1 is a flow chart of an information processing method in accordance with an embodiment of the present document.

FIG. 1 is a flow chart of an information processing method in accordance with an embodiment of the present document, the method is applied to a communication system, the communication system is connected with a plurality of communication clients, and the method specifically comprises the following steps:

In step 101, it is to receive the inquiry information of the first communication client in the communication system according to the preset rule;

first, since the communication system is connected with a plurality of clients, when a first client needs to initiate an issue, the first client can connect with the communication system, and the main connection mode can be via a software interaction interface or via calling a specified number, and so on, and in the embodiment of the present document, taking dialing a number for example, after the first client dials a preset fixed number, the first communication client will connect with the communication system.

Then, the communication client will prompt the user to input the inquiry information, after receiving the prompt, the first communication client inputs the inquiry information, wherein the inquiry information comprises the subject information and option information of the inquiry, after the communication system determines that the first communication client is connected with it, the communication system prompts the user to input the subject information with a first prompt mode, for example, a voice prompt can be set and it beeps once in the communication system, when the first communication client completely inputs the subject information, the communication system prompts the user to input the option information, before inputting the option information, the communication system prompts the user with another tone, so that the user implements the input of the N options according to the prompt tone, and finally the communication system processes the subject information and the N pieces of option information and generates the final inquiry information.

In the following, specific examples will be used to describe the process, for example, the communication system in the embodiment of the present document is connected with a plurality of clients, each client can access to the system via a fixed telephone number, when the user needs to initiate an issue, this user can dial a specific number to access to the system via a mobile phone or a fixed telephone, after accessing to the communication system, the system gives the user a prompt tone, after the user receives the tone, the user first inputs the subject of the issue, such as dinner. After the input is complete, that is, after the user determines that the input of the subject is complete, the communication system gives the user a second prompt tone, after the user receives the second prompt tone, the user can input the option information in the communication system, when the option information comprises a number of time points, such as Friday 20:00, Saturday 17:00, and Sunday 17:00, the user can select the corresponding keys to input a plurality of options, of course, after the communication system receives the plurality of options which the user needs to input, the communication system distinguishes and numbers the options, when the user first inputs Friday 20:00, the communication system numbers this time point as an option A, followed by an option B and an option C.

Finally, the communication system integrates the issue to get the final issue information, and then prompts the user to select the sending object, and the user can confirm the sending object according to the prompt of the system.

Wherein, the option information comprises one or more of the following: time information, address information and information of the number of persons.

After receiving the inquiry information from the user, the system executes step 102.

In Step 102, it is to send the inquiry message to M communication clients of the plurality of communication clients;

in step 101, the communication system completes the input of the user's inquiry information and the formulation of the sending object, thus the communication system will send the inquiry information to the formulated communication client based on the user's selection. Of course, the communication client saves all the contacts that the user needs to contact, and these contacts are the information of contacts uploaded by the user to the communication system.

After sending the received inquiry information to the M communication clients, the communication system executes step 103.

In Step 103, it is to receive M feedbacks from the M communication clients;

after the communication system sends the inquiry information to the M communication clients in step 102, the communication system real-time receives the M feedbacks returned by the M communication clients in real time, the feedback is mainly the option information of one first option selected by each of the M communication clients in the N options, and then the communication system processes the feedback from each of the M communication clients according to the preset rule, specifically speaking, the communications system collects the selection result of each of the M communication clients, and performs proportional operation on the selection results, and finally obtains a proportion relationship between all of the N options, and finally generates a proportion relationship graph.

For example, the first communication client inputs three options, including: A. Friday 20:00, B. Saturday 17:00, C. Sunday 17:00, in the communication system, and then the communication system sends the three options to the 10 clients specified by the first communication client, then these 10 clients can select according to their own conditions and then return the selection information to the communication client, and in the selection information received by the communication system, 5 persons select the option A, 3 persons select the option B, and 2 persons select the option C, finally the communication system obtains a proportion relationship between the three options, 5:3:2, based on the returned information, and generates a proportion relationship diagram.

In addition, when there is client in the M communication clients cannot participate in this issue, the client needs to record in the communication system.

Finally, after obtaining a statistical result of the information returned by the client, the communication system executes step 104.

In Step 104, it is to send the statistical result to the first communication client.

In the step 104, the communication system sends the statistical result and the recordings of the users who are unable to participate in the issue to the first client.

Therefore, after receiving the inquiry information from the client, the communication system in the embodiment of the present document sends the inquiry information to the M specified communication clients, receives the feedbacks from the M communication clients simultaneously, processes the feedbacks, and finally obtain a statistical result, thereby enabling the efficiency of the communication system on the multipoint information transfer, adding the function of the communication system on the feedback processing, and saving the user's time for the multipoint information transfer.

To further accurately process the statistical result, and send the final result to the first communication client, therefore, after generating the statistical result comprising the first proportion relationship graph of the first proportion relationship between all of the first options in the N options in the embodiment of the present document, the communication system determines whether the first proportion relationship between all of the N options reaches the preset proportion relationship value or not, and generates a first determination result.

If the first determination result characterizes that the first proportion relationship between all of the first options in the N options does not reach the preset proportion relationship, it sends the first proportion relationship graph as well as the N options to the M communication clients.

Then the communication system receives a second option selected by each of M communications clients in the N options, then processes the second options selected by the M communication clients, and obtains a second proportion relationship between all of the second options in the N options, and determines again whether the second proportion relationship reaches the preset proportion relationship or not, and generates a second determination result, when the second determination result characterizes that the second proportion relationship reaches the preset proportion relationship, generates a second proportion relationship graph according to the second proportion relationship, and sends the second proportion relationship graph to the first communication client.

Specifically speaking, after the communication system receives the M feedbacks returned by M communications clients for the first time, the communication system generates a proportion relationship between all of the options for the first time, for example: three options A, B and C are provided to 10 specified clients, the result returned for the first time is that: there are three clients selecting the A, three clients selecting the B, and another three clients selecting the C, and one client gives up, at this point, the proportion between the three options is 3:3:3, however, the communication system presets a condition, and the preset condition is only satisfied when the number of clients selecting one option is more than 50% of the total number of clients, that is, the proportion of 3:3:3 cannot meet the preset condition.

At this time, the communication system continues to send the statistical proportion relationship and the three options to the M clients, so that the M clients select again based on the proportion relationship.

After the clients select in the three options again, the communication system obtains, in real time, the information returned by the clients and makes statistics on the returned information again, and obtains a statistical result, if the statistical result at this time is that there are 6 clients selecting the option A, two clients selecting the option B, and one client selecting the option C, then the proportion relationship is: 6:2:1, then the number of clients selecting the option A is more than 50% of the total number, the communication system determines that the proportion relationship meets with the preset proportion value, the communication system sends the statistical result to the first communication client, and simultaneously sends the proportion relationship to the M clients, but does not send the option information to the M clients, therefore the first communication client is able to determine the time or place of the issue based on the proportion relationship, and the M communication clients can determine the time or place according to the statistical proportion relationship.

Therefore, a preset proportion relationship is set in the communication system to determine whether it needs to reselect or not, thereby reducing the process of the first communication client repeatedly sending the inquiry information, lessening the communication pressure and the processing procedure of the communication system, and shortening the processing time of the communication system, improving the processing efficiency of the communication system, also reducing the user's operation procedure, and shortening the user's operation time.

Additionally, the inquiry information is voice inquiry information or text inquiry information. The inquiry information in the embodiments of the present document is taken as the voice information to describe, and of course, the inquiry information can also be a short message or a multimedia message, if it is a short message, the first client needs to directly input the inquiry information including the subject as well as option information into the short message and send it to the communication system, so that the communication system sends the inquiry information to the formulated client, and finally the communication system sends the final statistical result to the first client. Of course, the multimedia message has the same implementation mode which is not repeated here.

Furthermore, in order to enable the communication system to provide the clients with better inquiry information processing modes, therefore, before the client inputs the inquiry information into the communication system, the client can select an one-time inquiry mode or a multi-time inquiry mode, that is, in the one-time inquiry mode, the communication system makes statistics to get the result once and returns the statistical result to the client which initiates the inquiry, and after the client selects the multi-time inquiry mode, the communication system queries the specified clients multiple times, and returns the final result to the initiating end of the inquiry information.

Figure 2:
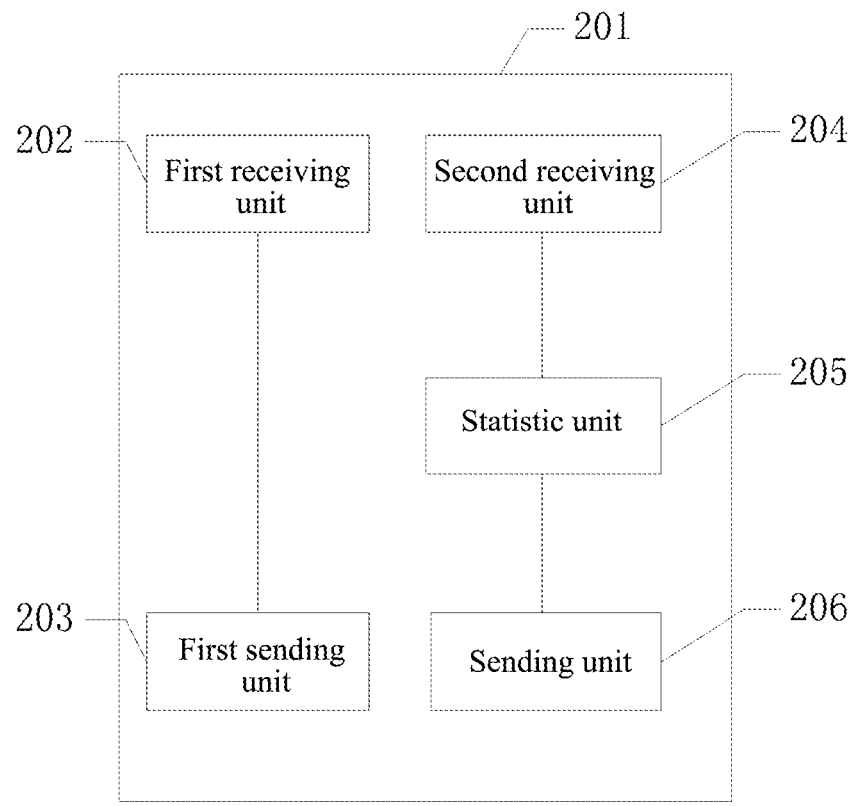
FIG. 2 is a schematic diagram of the specific structure of a communication system in accordance with an embodiment of the present document.

Corresponding to the method in accordance with the embodiment of the present document, the embodiment of the present document further provides a communication system, and FIG. 2 illustrates a schematic diagram of the specific structure of communication system 201 in accordance with an embodiment of the present document, and the communication system comprises:

a first receiving unit 202, configured to receive the inquiry information of the first communication client in the communication system according to the preset rule; and a first sending unit 203, configured to send the inquiry information to M communication clients of the plurality of communication clients, wherein, M is a positive integer greater than or equal to two;

a second receiving unit 204, configured to receive M feedbacks from the M communication clients;

a statistic unit 205, configured to process the M feedbacks to obtain a statistical result;

a sending unit 206, configured to send the statistical result to the first communication client.

Wherein, the first receiving unit being configured to receive the inquiry information of the first communication client in the communication system according to the preset rule, comprises:

receiving the subject information in the inquiry information of the first communication client according the first preset rule;

after receiving the subject information, receiving the N options in the inquiry information of the first communication client in accordance with the second preset rule, wherein, N is a positive integer greater than or equal to 2.

Wherein, the second receiving unit being configured to receive the M feedbacks from the M communication clients, is specifically:

receiving the M feedbacks of first options selected by all of the M communication clients in the N options.

Wherein, the statistic unit being configured to process the M feedbacks to obtain a statistical result, is specifically:

according to the received first options selected by the M communication clients in the N options, generating a statistical result comprising a first proportion relationship graph of the first proportion relationship between all of the first options in the N options.

Wherein, the option information comprises one or more of the following: time information, address information, and information of the number of persons.

Wherein, the inquiry information is voice inquiry information or text inquiry information.

One or more embodiment provided in the embodiments of the present document have at least the following technical effects or advantages:

after receiving the inquiry information from the client, the communication system in the embodiment of the present document sends the inquiry information to the M specified communications clients, receives the feedbacks from the M communication clients simultaneously, processes the feedbacks, and finally obtains a statistical result, thereby achieving the efficiency of the communication system on multipoint information transfer, also adding the function of the communication system on the feedback processing, and saving the user's time for multipoint information transfer.

By setting a preset proportion relationship in the communication system to determine whether it needs to reselect or not, the process of the first communication client repeatedly sending inquiry information is shortened, the communication pressure and the processing procedure of the communication system are lessened, the processing time of the communication system is shortened, the processing efficiency of the communication system is improved, the user's operation procedure is reduced, and the user's operation time is shortened.

Obviously, a person skilled in the art may make various changes and modifications of the present document without departing from the spirit and scope of the present document. Thus, if these changes and modifications of the present document belong to the scope of the claims as well as the technical equivalents of the present document, the present document is also intended to comprise these changes and modifications.

INDUSTRIAL APPLICABILITY

By setting a preset proportion relationship in the communication system to determine whether it needs to reselect or not, the process of the first communication client repeatedly sending inquiry information is shortened, the communication pressure and the processing procedure of the communication system are lessened, the processing time of the communication system is shortened, the processing efficiency of the communication system is improved, the user's operation procedure is reduced, and the user's operation time is shortened.

Obviously, a person skilled in the art may make various changes and modifications of the present document without departing from the spirit and scope of the present document. Thus, if these changes and modifications of the present document belong to the scope of the claims as well as the technical equivalents of the present document, the present document is also intended to comprise these changes and modifications.

What is claimed is:

1. An information processing method, applied to a communication system, wherein the communication system connects with a plurality of communication clients, and the method comprises the following steps that are executed by a processor in the communication system:

prompting a user of a first communication client to input inquiry information after determining that the first communication client is connected with the communication system;

receiving inquiry information of the first communication client in the communication system according to a preset rule;

prompting the user to select sending objects;

sending the inquiry information to M communication clients of the plurality of communication clients, wherein, M is a positive integer greater than or equal to 2;

receiving M feedbacks from the M communication clients, wherein when there is a user of a communication client in the M communication clients who cannot participate in an issue of the inquiry, the user records in the communication system;

processing the M feedbacks and obtaining a statistical result, wherein a proportion relationship is preset in the communication system, and when the statistical result does not meet the preset proportion relationship, sending again the inquiry information to the communication clients for reselection of the communication clients, until the statistical result meets the preset proportion relationship;

sending the statistical result and the recording of the user who cannot participate in the issue to the first communication client.

2. The method of claim 1, wherein, receiving the inquiry information of the first communication client in the communication system according to the preset rule comprises:

receiving subject information in the inquiry information of the first communication client according to a first preset rule;

after receiving the subject information, receiving N options in the inquiry information of the first communication client according to a second preset rule, wherein, N is a positive integer greater than or equal to 2.

3. The method of claim 2, wherein, receiving M feedbacks from the M communication clients is specifically:

receiving M feedbacks of first options selected by all of the M communication clients from the N options.

4. The method of claim 3, wherein, processing the M feedbacks to obtain a statistical result is specifically:

according to the received first options selected by the M communication clients from the N options, generating a statistical result comprising a first proportion relationship graph of a first proportion relationship between all of the first options in the N options.

5. The method of claim 4, wherein, after generating a statistical result comprising a first proportion relationship graph of a first proportion relationship between all of the first options in the N options, the method further comprises:

determining whether the first proportion relationship between all of the first options in the N options reaches a preset proportion relationship value or not, and generating a first determination result;

if the first determination result characterizes that the first proportion relationship between all of the first options in the N options does not reach the preset proportion relationship value, sending the first proportion relationship graph and the N options to the M communication clients.

6. The method of claim 5, wherein, after sending the first proportion relationship graph and the N options to the M communication clients, the method further comprises:

receiving a second option selected by each of the M communication clients from the N options;

processing the second options selected by the M communication clients, and obtaining a second proportion relationship between all of the second options in the N options;

determining whether the second proportion relationship reaches the preset proportion relationship or not, and generating a second determination result;

if the second determination result characterizes that the second proportion relationship reaches the preset proportion relationship, generating a second proportion relationship graph based on the second proportion relationship, and sending the second proportion relationship graph to the first communication client.

7. The method of claim 6, wherein, after sending the second proportion relationship graph to the first communication client, the method further comprises:

through the second proportion relationship graph, determining one option in the N options and sending it to the first communication client and the M communication clients.

8. The method of claim 7, wherein, the option information comprises one or more of the following items: time information, address information, and information of a number of persons.

9. The method of claim 1, wherein, the inquiry information is voice inquiry information or text inquiry information.

* * * * *